H. E. ELLIS.
APPARATUS FOR BOILING FIBER FOR THE MANUFACTURE OF CELLULOSE.
APPLICATION FILED JAN. 12, 1917.

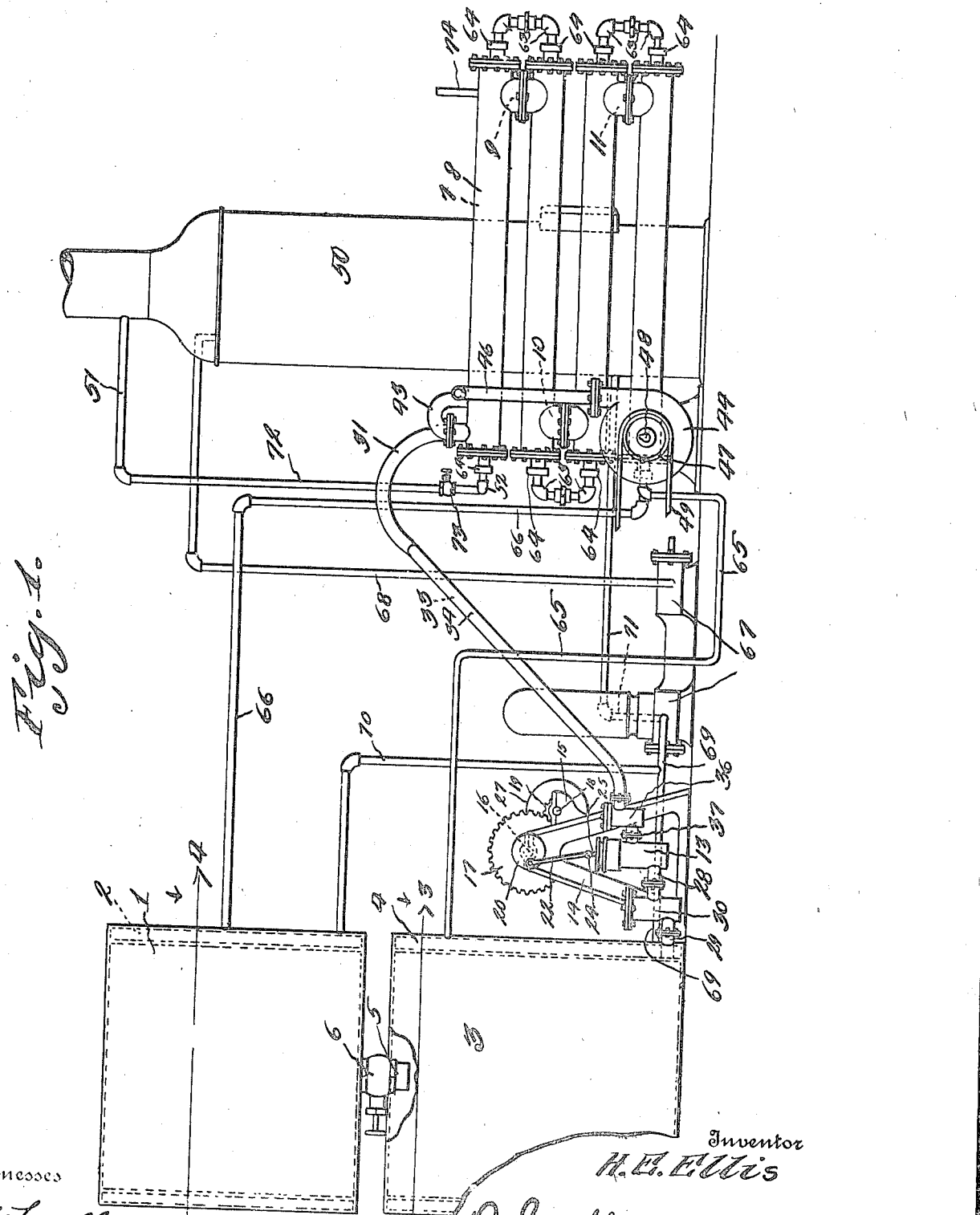

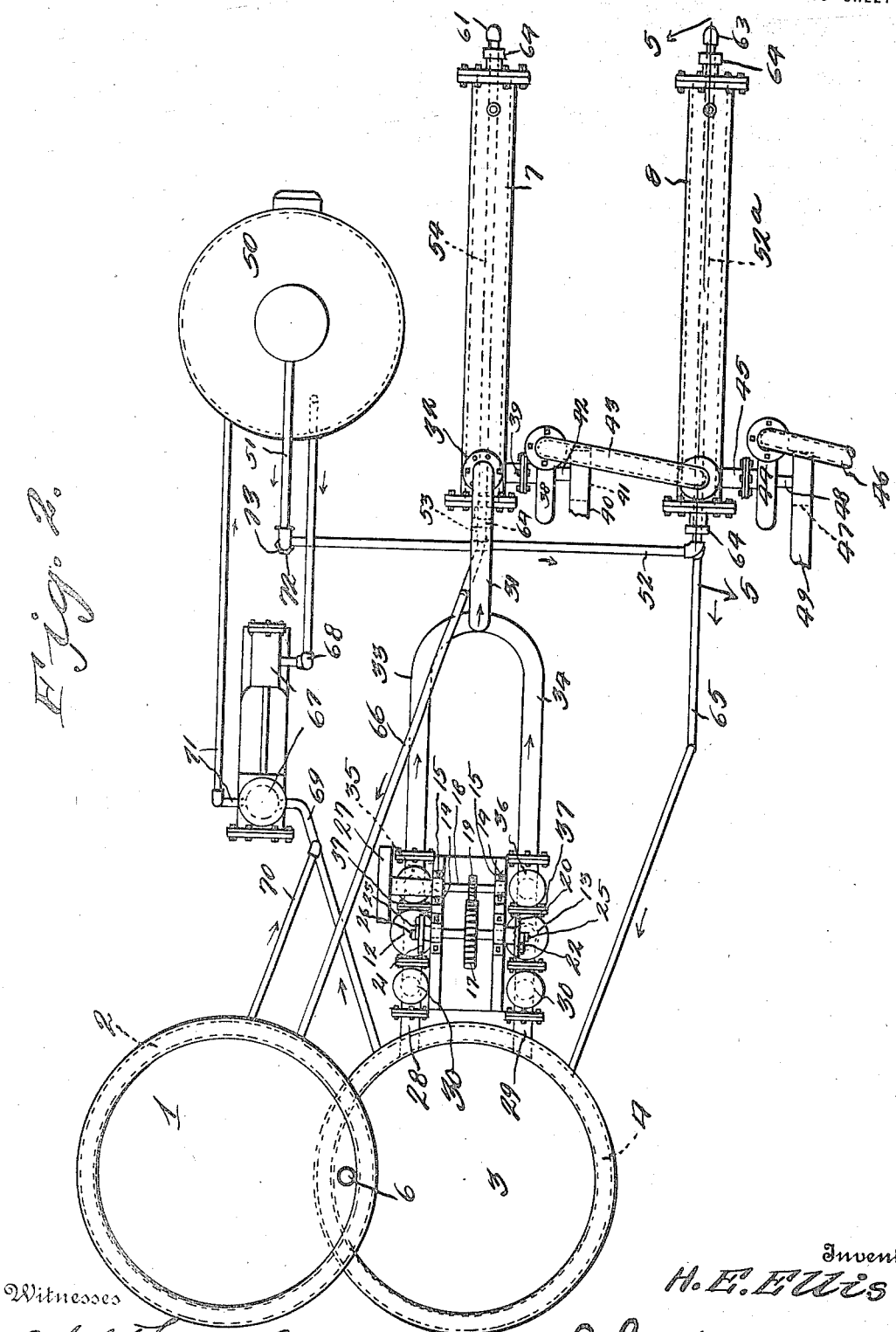

1,236,370.

Patented Aug. 7, 1917.
4 SHEETS—SHEET 3.

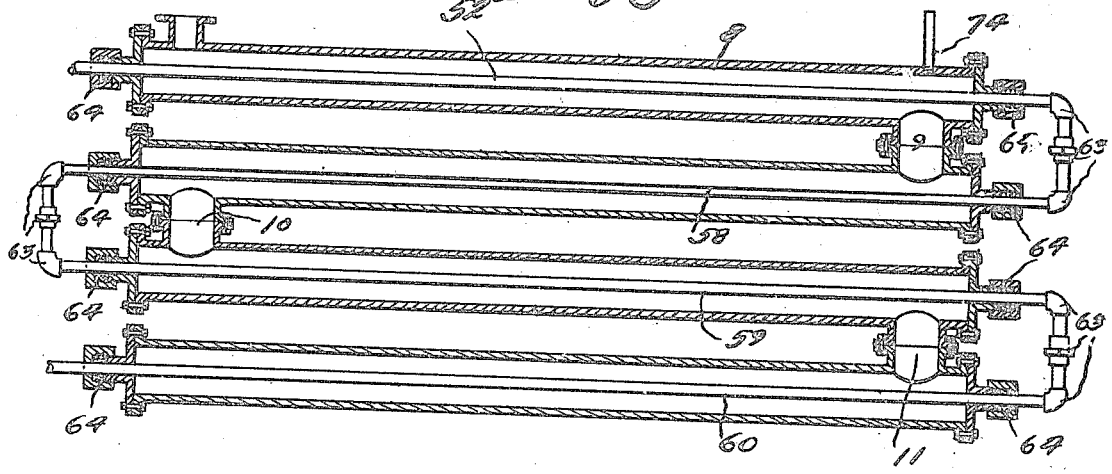

UNITED STATES PATENT OFFICE.

HARRY ELLWOOD ELLIS, OF PALMETTO, FLORIDA, ASSIGNOR OF ONE-HALF TO J. W. WILHELM, OF PALMETTO, FLORIDA.

APPARATUS FOR BOILING FIBER FOR THE MANUFACTURE OF CELLULOSE.

1,236,370.　　　　Specification of Letters Patent.　　Patented Aug. 7, 1917.

Application filed January 12, 1917. Serial No. 142,036.

*To all whom it may concern:*

Be it known that I, HARRY ELLWOOD ELLIS, a citizen of the United States, residing at Palmetto, in the county of Manatee, State of Florida, have invented a new and useful Apparatus for Boiling Fiber for the Manufacture of Cellulose; and I do hereby declare the following to be a full, clear, and exact description of the invention, such as will enable others skilled in the art to which it appertains to make and use the same.

This invention relates to an improved apparatus for steam boiling fresh cut reeds, grass, pith, or other fibrous plants, whereby cellulose may be manufactured, or for boiling cocoanut or other fibers, which cellulose may be used for the manufacture of various articles, such as paper, cotton, etc.

One of the objects of the invention is the production of an apparatus of this kind, whereby the reduction of fibrous plants in a green condition to cellulose may be easily, quickly and cheaply brought about.

A further object of the invention is to provide a suitable tank into which the fibrous material and chemicals may pass, whereby a high temperature of heat from steam may be subjected to the mixture, to assist in reducing the mixture to a flowing or running state.

A further object of the invention is to provide means to break the particles of the mixture.

A further object of the invention is to provide means to subject a high temperature of heat and steam to a smaller quantity of the mixture, thereby additionally reducing the mixture to a more thorough soluble state, and breaking the particles therein.

In practical fields, the details of construction may necessitate alterations, falling within the scope of what is claimed.

The invention comprises further features and combination of parts, as hereinafter set forth, shown in the drawings and claimed.

In the drawings:—

Figure 1 is a view in side elevation of the complete apparatus, constructed in accordance with the invention.

Fig. 2 is a plan view.

Fig. 5 is a vertical sectional view on line 5—5 of Fig. 2.

Fig. 6 is a view in side elevation of a series of cellulose passage pipes, through which steam pipes pass, similar to those shown in Fig. 5.

Figure 4:
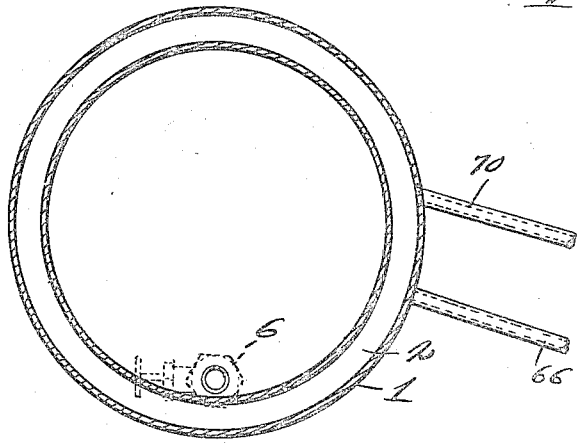
Fig. 4 is a sectional view on line 4—4 of the mixing tank shown in Fig. 1.
Figure 3:
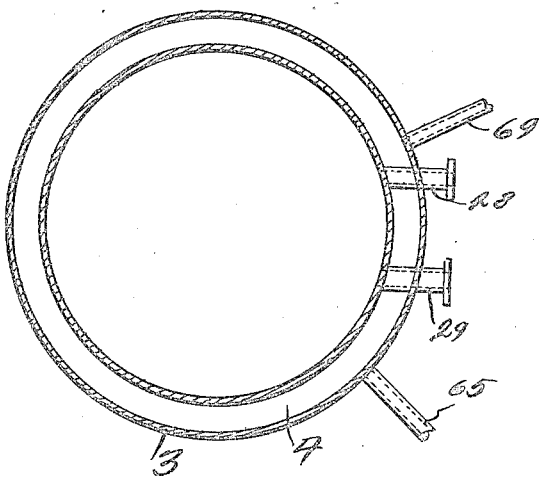
Fig. 3 is a sectional view on line 3—3 of the stuff tank shown in Fig. 1.

In the manufacture of cellulose, the necessary material or fiber from reeds, grass or other fibrous plants and the like, or the fibrous material from cocoanuts and the like, is first shredded to a proper consistency. This material is then deposited in the mixing tank or vat 3. A chemical solution of caustic soda or any other suitable chemical is then mixed by any suitable means (not shown), in the tank 1. The two tanks are connected by a connection 5, provided with a valve 6, and by opening this valve, the chemical solution may be allowed to flow into the tank or vat 3, where it is, by any suitable means (not shown), thoroughly mixed and agitated with the fibrous material. The tank 1 is provided with an annular steam jacket or space 2, whereby the chemical solution may be pre-heated by a high temperature of steam heat. The tank or vat 3 is below and slightly to one side of the tank 1, and is provided with a suitable jacket or space 4, whereby the mixture of chemical solution of caustic soda and fibrous material may be pre-heated by a high temperature of steam heat. In removing the material from the tank 3, it is further subjected to steam treatment in order to reduce the same to a soluble state, and to subject the mixture to this additional steam treatment, there is a plurality of series of tubular chambers or undulate passages provided, said series being designated by the numerals 7 and 8. The tubular chambers of each series are in communication by means of the passages 9, 10 and 11. To carry the material from the tank 3 to these series of tubular chambers, a pair of conventional lifting stuff pumps, or merely stuff pumps 12 and 13, is provided. The interior construction of the pumps is not shown. However, disposed between the pumps is a suitable frame consisting of the uprights 14, which are provided with lateral bearings 15. Journaled in the bearings of the upper parts of the uprights is a shaft 16 provided with a centrally disposed gear 17. Journaled in the bearings 15 is a shaft 18 provided with a pinion 19, which meshes with the gear 17. Mounted upon the ends of the shafts 16 are disks 20 and 21, to which the ends of the pitmen 22 and 23 are eccentrically connected. The other ends of the pitmen are connected at 24 to the pump piston rods 25 and 26. On one end of the shaft 18 a suitable pulley 27 is mounted to rotate with the shaft. By means of the pulley, any suitable means (not shown) may be geared, in order to impart revoluble movement to the shaft 18, which in turn will operate the shaft 16 through the medium of the gear and pinion 17 and 19. It is to be noted that the pitmen 22 and 23 are so connected to the disks that the pump piston rods will alternately operate. The pump cylinders 12 and 13 are connected to and in communication with the interior of the tank 3 by means of the connections 28 and 29, and the enlarged conventional forms of the check valves 30. Referring to Figs. 1 and 2, it is to be noted that uppermost tubular chamber of the series 7 (at the end of said chamber) a tubular conduit or pipe 31 is coupled, as shown at 32. This conduit or pipe 31 merges into and in communication with the branch pipes or tubular conduits 33 and 34, which in turn are coupled to conventional forms of check valves 35 and 36, similar to the valves 30, and the casings of which check valves are in turn connected to the pump cylinders 12 and 13 by the connections 37. A suitable centrifugal pump 38 is coupled to and communicates with the lowermost tubular chamber of the series 7 by means of the connection 39. By means of a suitable belt 40, power from any suitable source (not shown) may be imparted to the pulley 41 of the shaft 42 of the pump 38. By means of the tubular conduit 43, the centrifugal pump 38 is connected to and in communication with the uppermost tubular chamber of the series 8, and by means of the centrifugal pump 38, the material from the lowermost tubular chamber of the series 7 is lifted and forced into the uppermost tubular chamber of the series 8. A second centrifugal pump 44 is connected to and in communication with the lowermost tubular chamber of the series 8, by means of the connection 45. By means of this pump 44, the material is lifted to and forced through the discharge or outlet pipe 46, and when the material or mixture discharges from this pipe 46, it has been reduced to cellulose, and after the chemical solution has been removed, or recovered, in a manner specifically set forth and claimed in the co-pending application for the method of manufacturing cellulose, filed 24th day of January 1917, Serial Number 144,168, and after the cellulose has been washed and refined, as set forth in the said co-pending application, it may be used for various purposes, as aforesaid. Any suitable power (not shown) may be belted to the pulley 47 (which is mounted upon and rotatable with the shaft 48 of said pump) by means of the belt 49, so as to impart motion to the pump. When operating the pumps 12 and 13, the material from the tank 3 is drawn into each of the pumps past the check valves 30 on the upward stroke of the pistons of said pumps. On the downward strokes of the pistons 12 and 13, the material in the pumps flow to the upper sides of the pistons, (not shown) of said pump, past the conventional form of check valve (not shown), which may be carried by the pistons of the pumps, then, upon the subsequent upward movements of the pistons of pumps 12 and 13, the material above said pistons (not shown) is forced past the check valves 35 and 36. These operations continue, thereby forcing the material through the branches 33 and 34, through the conduit 31, and thence, into the series of tubular chambers 7, where it is first subjected to a high temperature of heat from steam. The material is transferred from the tubular chambers 7 to the tubular chambers 8 by means of the centrifugal pump 38 and the conduit or tubular connection 43, where the material is again subjected to the high temperature of heat from the steam, and then is discharged out through the conduit or pipe 46. By means of the blades of the centrifugal pumps 38 and 44, the particles of the mixture are thoroughly broken or disintegrated, that is, the cellular tissues. Moreover, the pumps 38 and 44 relieve any pressure in the system.

In order to subject the high temperature of heat from steam to the combined fibrous material and chemicals, a steam boiler of any conventional type is provided. Extending from the top of the boiler, or rather the steam dome thereof, is a pipe 51, which extends outwardly, downwardly, and transversely, the transverse portion 52 terminating in a pipe section passing centrally and longitudinally through the uppermost tubular chamber of the series 8. Also connected to the transverse portion 52, as shown at 53, is a pipe section 54, which passes centrally and longitudinally to the uppermost tubular chamber of the series 7. Arranged in the tubular chambers of both series, below their uppermost chambers, are pipe sections 55, 56, 57, 58, 59 and 60. The pipe sections of the series of tubular chambers 7 are joined in sequence and in communication, by means of the connections or unions 61, so that the steam will have a continuous flow uninterrupted. The pipe sections 52ª, 58, 59 and 60 are similarly joined by the connections or unions 63, whereby the steam of the tubular chambers 8 may also have a continuous uninterrupted flow. The steam pipe sections pass through suitable stuffing boxes 64. The lowermost steam pipe sections 57 and 60 merge into the pipes or conduits 65 and 66, which communicate with the steam jackets 4 and 2, respectively, of the tanks 3 and 1, thereby carrying the steam into said jackets, whereby the high temperature of heat therefrom may be subjected to the chemical solution and the material in the said tanks. A suitable multiple cylinder pump 67 is provided, one cylinder thereof being connected to and in communication with the steam dome of the boiler 50, by means of the pipe or conduit 68. Extending from the other cylinder of the pump 67 is a pipe 69, which connects to and is in communication with the steam jacket 4. Branching from the pipe 69 and extending upwardly is a pipe 70, which connects and is in communication with the steam jacket 2 of the tank 1. Connected to one cylinder of the pump 67 at a point diametrically opposite the pipe 69, and extending upwardly and laterally, is a pipe 71, which connects to and is in communication with the water chamber of the boiler. The multiple cylinder pump is operated by steam from the dome of the boiler through the pipe 68. By means of the multiple cylinder pump 67, the pipes 69, 70 and 71, the condensation of steam from the steam jackets 2 and 4 is carried back to the water chamber of the boiler. The downwardly extending partition 72 of the pipe 51 is provided with a suitable valve, 73, in order to control the supply of steam through the steam pipe sections 54, 55, 56, 57, 52ª, 58, 59 and 60. Owing to the moisture existing in the material from which the cellulose is manufactured or formed, a certain amount of steam is generated in the tubular chambers, owing to the intense heat from said steam pipe sections of said chamber. Therefore, to carry off this steam, the uppermost tubular chambers of both series 7 and 8 are provided with steam exhaust tubes 74, in order to relieve the pressure of steam from said tubular chambers.

Operation.

In the operation, the fibrous material in a finally divided condition, as brought out in the co-pending method application above referred to, is mixed with a suitable quantity of chemical solution of caustic soda or other suitable chemical solution, in the tank 3, until it is brought to a consistency capable of being pumped. This mixture of solution and fiber is pumped or formed through the pipes 33 and 34, and the pipe 31, into the uppermost tubular chamber 54 of the series 7, by means of the stub pumps 12 and 13. The material passes through the several tubular chambers of the bath series, and is kept slowly and continuously moving through said chambers. The centrifugal pump 38 is driven at such a speed as to be kept timed or in unison with the stuff pumps 12 and 13, whereby the material (which is discharged from the centrifugal pump 38) may be kept moving by the action of the pump through the tubular chambers of the series 8, at substantially the same rate of speed as shown moving through the chambers of the series 7. The tank 3 is jacketed for the dual purpose of pre-heating the material and obtaining water from the condensation of the steam for the steam boiler. By pre-heating the material, it is rapidly brought to a boiling point, when passing through the tubular chambers, by the heat radiating from the steam pipes (which pass through said chambers) which are kept at a high temperature by means of super-heated steam from the boiler 50. The material, after passing through the series of the chambers 7, is subjected strongly to trituration, while in a boiling condition, by means of the centrifugal pump 38. By means of the pump 38, the material discharged therefrom is carried over to the series of chambers 8, where the above operations are repeated. Other series of chambers, similar to the series of chambers 7 and 8, may be added, according to the kind of raw material to be reduced, and the quantity and quality of the finished product desired. The effect on the raw material of boiling in a chemical solution and trituration by the centrifugal pumps alternately, is to rapidly and completely disintegrate the cellular tissue, so that clean cellulose in quantity may be produced continuously, at a low cost.

The invention having been set forth, what is claimed as new and useful, is:—

1. In a machine for the manufacture of cellulose, a series of tubular chambers superimposed and in parallelism, and having connections whereby an undulated passage for the cellulose material is formed, and a steam pipe extending longitudinally through each tubular chamber to subject high temperature of steam heat to the cellulose material, and means for breaking and disintegrating the cellular tissues of the cellulose as it leaves said passage.

2. In a machine for the manufacture of cellulose, a series of tubular chambers superimposed and in parallelism, and having connections whereby an undulated passage for the cellulose material is formed, and a steam pipe extending longitudinally through each tubular chamber to subject high temperature of steam heat to the cellulose material, and means for breaking and disintegrating the cellular tissues of the cellulose as it leaves said passage, and means for relieving the pressure of steam that may generate in the material in said passage.

3. In a machine for the manufacture of cellulose, a series of tubular chambers superimposed in parallelism, and having connections whereby an undulated passage for the cellulose material is formed, means for forcing the material through said chambers, means for preheating said material for disintegrating the same, and means extending through the chambers for subsequently heating and disintegrating the material.

4. In a machine for the manufacture of cellulose, a series of tubular chambers superimposed in parallelism, and having connections whereby an undulated passage for the cellulose material is formed, means for forcing the material through said chamber, means for preheating said material for disintegrating the same, and means extending through the chambers for subsequently heating and disintegrating the material, and means to disintegrate or break the material additionally as it leaves said chambers.

5. In a machine for the manufacture of cellulose, an undulated steam heating passage for cellulose material, a container for the cellulose material, means for conveying said material from said container to and through said passage, steam heating means extending through said passage for heating said material, said container having a space surrounding the same, and means connecting said space and the steam heating means for preheating said material, and means to additionally disintegrate or break the material as it leaves said passage.

6. In a machine for the manufacture of cellulose, a steam heated passage for the material, and means for pre-heating said material before it enters the passage, and means for disintegrating the material as it leaves said passage.

7. In a machine for the manufacture of cellulose, an undulated passage for the material, a container for the material provided with a steam jacket, and means for steam-heating said passage, said steam-heating means having connections with the jacket for pre-heating the material, and means for disintegrating the material after it leaves the passage.

8. In a machine for the manufacture of cellulose, an undulated passage, the steam pipe extending through said passage for heating the same, means for steam-pre-heating said material before it enters the passage, and means for disintegrating the material as it leaves the passage.

In testimony whereof I have signed my name to this specification in the presence of two subscribing witnesses.

HARRY ELLWOOD ELLIS.

Witnesses:
J. O. BROWN,
B. T. OWEN.